W. ZIMMERMANN, Jr.
HARROW ATTACHMENT FOR PLOWS.
APPLICATION FILED NOV. 12, 1915.
1,196,631.
Patented Aug. 29, 1916.
2 SHEETS—SHEET 2.
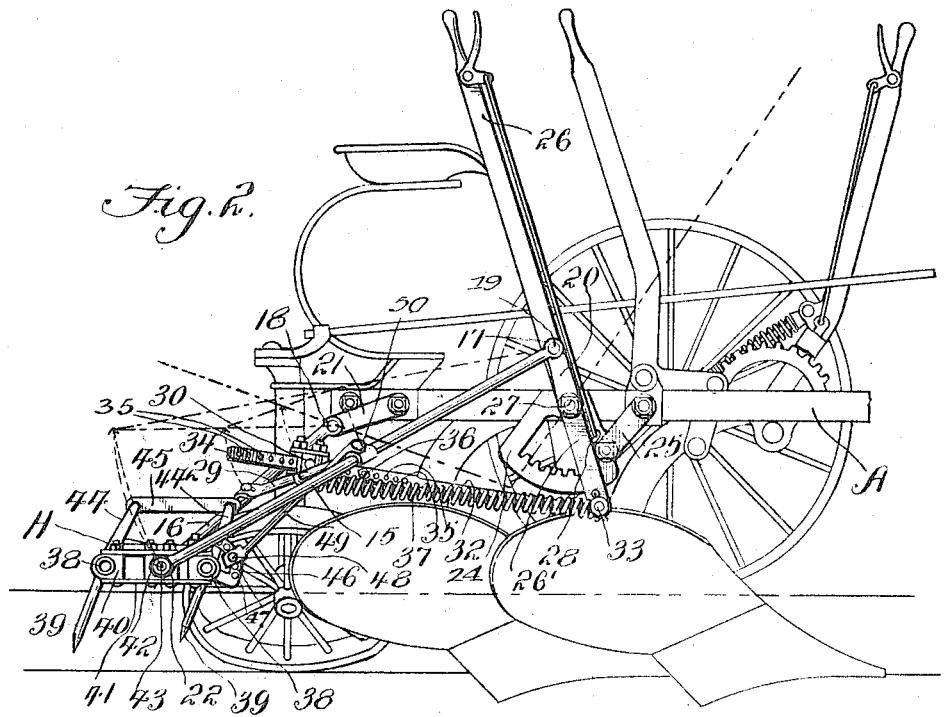
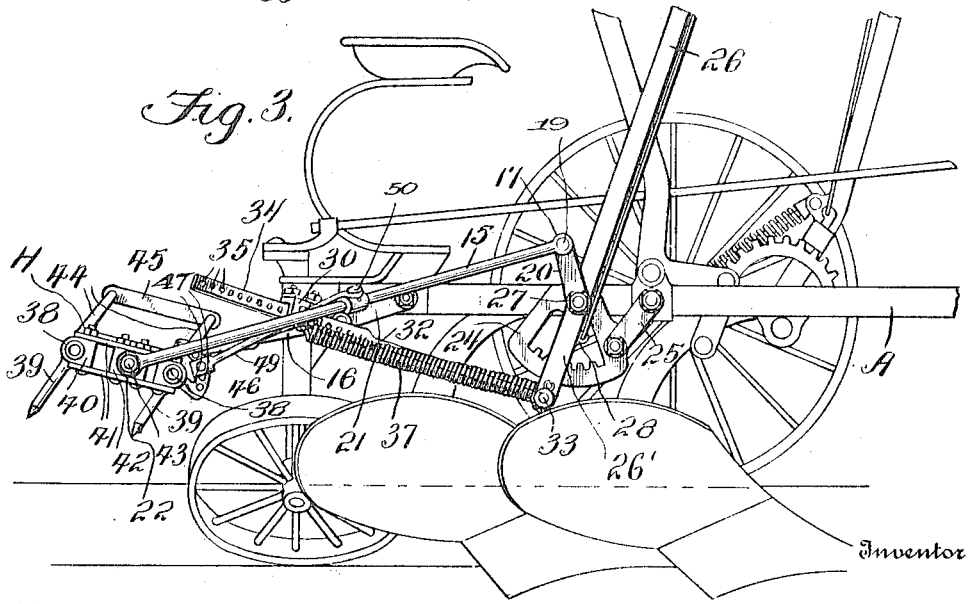

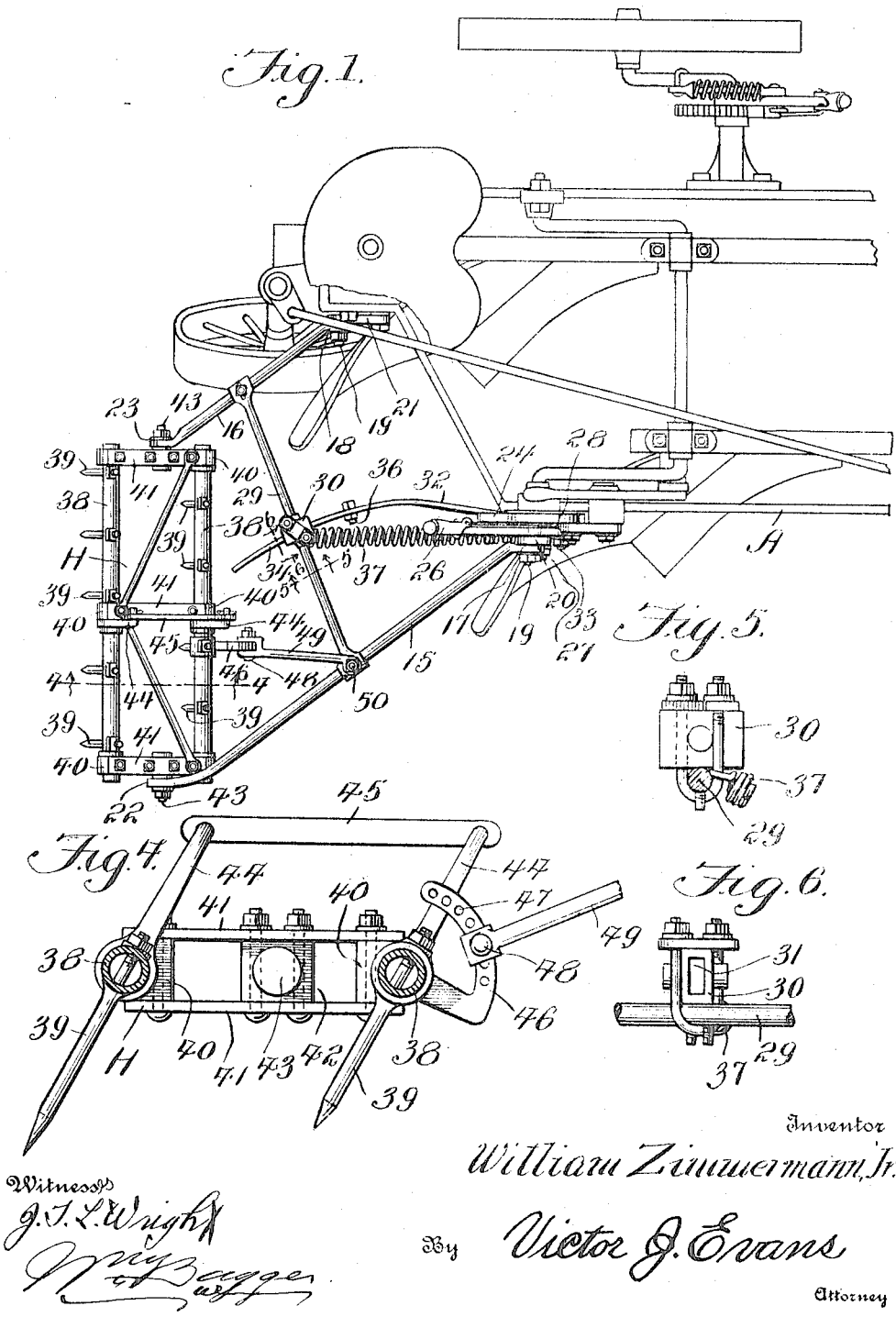

UNITED STATES PATENT OFFICE.

WILLIAM ZIMMERMANN, JR., OF FREEBURG, ILLINOIS.

HARROW ATTACHMENT FOR PLOWS.

1,196,631.   Specification of Letters Patent.   Patented Aug. 29, 1916.

Application filed November 12, 1915. Serial No. 61,113.

*To all whom it may concern:*

Be it known that I, WILLIAM ZIMMERMANN, Jr., a citizen of the United States, residing at Freeburg, in the county of St. Clair and State of Illinois, have invented new and useful Improvements in Harrow Attachments for Plows, of which the following is a specification.

This invention relates to harrow attachments for sulky plows, and it has for its object to produce a light, inexpensive and simple harrow attachment which may be quickly and conveniently attached to the frame of a sulky or riding plow of almost any conventional type for the purpose of breaking and pulverizing the soil as it is being turned by the plow.

A further object of the invention is to produce a harrow attachment of simple and improved construction, embodying a harrow, the teeth of which may be tilted to various angles, a frame carrying said harrow and means for raising and lowering said frame from and to a working position.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view showing the improved device attached to a riding plow. Fig. 2 is a side elevation, showing the device mounted on the frame of a riding plow and in position for operation. Fig. 3 is a side elevation, showing the device mounted on the frame of a plow and in a raised or inoperative position. Fig. 4 is a sectional detail view, enlarged, taken on the line 4—4 in Fig. 1. Fig. 5 is a sectional detail view, enlarged, taken on the line 5—5 in Fig. 1. Fig. 6 is a sectional detail view, enlarged, taken on the line 6—6 in Fig. 1.

Corresponding parts in the several figures are denoted by like characters of reference.

The frame of the improved device includes two side members which are disposed in approximately parallel relation, one of said members 15 being of a length materially exceeding that of the member 16 which is disposed in substantially parallel relation thereto. The side members are slightly bent at their forward ends to form lugs or brackets 17, 18 adapted to be pivotally connected by pins or bolts 19 with supporting members 20, 21 which are mounted on the frame A of an ordinary plow sulky. The rearward ends of the side members 15, 16 are bent to form lugs or brackets 22, 23 between which the harrow H is mounted and supported, as will be presently more fully described. Suitably secured on the plow frame A is a segment rack 24, the same being also connected with the plow frame by a brace member 25. A hand lever 26 which is fulcrumed at 27 is provided with a stop member 28 engaging the segment rack for the purpose of retaining the lever and related parts in position at various adjustments.

The frame bars 15, 16 are connected together by a cross bar 29 on which is mounted a clamp 30 having a slot 31. A rod 32, which is pivotally connected at 33 with the lower end of the hand lever 26, is provided with a flat terminal portion 34 that extends slidably through the slot 31 of the clamp 30, the flat portion 34 being provided with a plurality of apertures 35 for the passage of a pin or bolt 36 constituting a stop member, whereby its movement in one direction with respect to the clamp may be limited. The rod 32 and its flattened portion 34 are preferably curved, as best seen in Fig. 1, in such a manner that the flattened portion will slide readily through the slot in the clamp. A coiled spring 37 is connected at one end with the clamp 30 and at the other end with the downwardly extending arm 26' of the lever 26, so that by means of the lever the spring may be tensioned to force the harrow attachment in a groundward direction.

The harrow H includes two bars 38 which are represented as being of tubular construction, said bars being equipped with teeth 39 which are connected therewith in any convenient manner, it being noted that the teeth connected with the rearward bar are of greater length than the teeth connected with the forward bar. The ends of the bars 38 are pivotally supported in boxes or bearings 40 that are clamped between straps or frame bars 41 at each end. The frame bars 41 also support boxes 42 which are bolted or clamped securely between said frame bars about midway between their front and rear ends, said boxes being for the reception of pivot members 43 whereby the harrow frame is pivotally connected with the lugs or brackets 22, 23 of the frame bars 15, 16. Each harrow bar 38 is provided with an upwardly extending arm 44, said arms being pivotally connected with the ends of a connecting bar 45, whereby when one harrow bar is rocked about its axis, a corresponding movement will be transmitted to the other harrow bar, thus enabling the teeth of the two harrow bars to be simultaneously adjusted to various slanting or inclined positions with respect to the surface of the ground. One of the harrow bars is provided with an arcuate arm or segment 46 having a plurality of perforations 47, any one of which may be connected by means of a bolt 48 with one end of an adjusting rod 49, the other end of which is connected at 50 with the frame bar 15. It will thus be seen that by proper adjustment of the bolt 48, the harrow bars may be adjusted so as to present the harrow teeth at various angles with respect to the ground and to retain them in adjusted position when the device is in operation.

From the foregoing description, taken in connection with the drawings hereto annexed, it will be readily seen that by manipulating the lever 26 the frame carrying the harrow may be raised or lowered, thus lifting the harrow from the ground or forcing it in the direction of the ground to an operative position where it may be held under a desired degree of tension by the spring 37, the latter being tensioned by means of the hand lever with which it is connected. The extent to which the harrow is raised may be controlled by the lever, but the range of movement may be varied by proper adjustment of the bolt or stop member 36 engaging the apertures in the flat portion 34 of the rod 32, said stop member serving to limit the movement of the rod 32 through the slotted clamp 30 by abutting on said clamp. The rod 49 not only controls the slant or adjustment of the harrow teeth, but it also serves to prevent the harrow frame from rocking or vibrating about the axes of the connecting pins or members 43. The improved device is capable of being mounted upon and used in connection with the frame of almost any conventional riding or sulky plow, and when properly adjusted and used it will serve to break and pulverize the soil that is being turned by the plow, leaving the same in excellent condition for seeding, and thus saving a great amount of time, inasmuch as it attains at a single passage over the field the same results which have heretofore been accomplished only by two or more passages over the field with implements of various descriptions. The improved device, moreover, is light, inexpensive and easily applied or removed, as may be desired.

Having thus described the invention, what is claimed as new, is:—

1. In a harrow attachment for riding plows, a pair of frame bars pivotally supported at their forward ends, a harrow supported between the rearward ends of the bars, a cross bar connecting the frame bars, a clamp on said cross bar having a vertical slot, a hand lever, a rod connected with said lever and having a portion slidably engaging the slotted clamp, stop means for limiting the movement of the rod in one direction with respect to the clamp, and means for retaining the hand lever in position at various adjustments.

2. In a harrow attachment for riding plows, a pair of frame bars pivotally supported at their forward ends, a harrow supported between the rearward ends of the bars, a cross bar connecting the frame bars, a clamp on said cross bar having a vertical slot, a hand lever, a rod pivotally connected with said lever and slidably engaging the slotted clamp, a coiled spring connecting the clamp with the lever to assist in forcing the frame and the harrow in a groundward direction, and means for retaining the hand lever in position at various adjustments.

3. In a harrow attachment for riding plows, a pair of frame bars pivotally supported at their forward ends, a harrow supported between the rearward ends of the frame bars, a slotted clamp constituting a guide member fixed on the harrow supporting frame, a hand lever, a push rod connected with the lever and guided slidably with respect to the guide member, a stop member adjustably connected with the push rod and adapted to abut on the guide member to exert a pushing action against the same to lift the harrow from the ground, and a spring connecting the guide member with the lever and adapted to be tensioned to force the harrow in a groundward direction.

In testimony whereof I affix my signature in presence of two witnesses.

WILLIAM ZIMMERMANN, Jr

Witnesses:
    JOSEPH C. BECKER,
    JOSEPH G. REUTER.